Feb. 17, 1970     J. RESAG ET AL     3,495,871
ADJUSTABLE SEAT, PRIMARILY FOR MOTOR VEHICLES
Filed Nov. 3, 1967     6 Sheets-Sheet 1

Inventors:
Jörg RESAG
Wolfgang FUSSNEGGER
by: Arthur O. Klein
their Attorney

Feb. 17, 1970 J. RESAG ET AL 3,495,871

ADJUSTABLE SEAT, PRIMARILY FOR MOTOR VEHICLES

Filed Nov. 3, 1967 6 Sheets-Sheet 2

Inventors:
Jörg RESAG
Wolfgang FUSNEGGER
by: Arthur O. Klein
their Attorney

Feb. 17, 1970       J. RESAG ET AL       3,495,871
ADJUSTABLE SEAT, PRIMARILY FOR MOTOR VEHICLES
Filed Nov. 3, 1967                       6 Sheets-Sheet 3

Inventors:
Jörg RESAG
Wolfgang FUSNEGGER
by: Arthur O. Klein
their Attorney

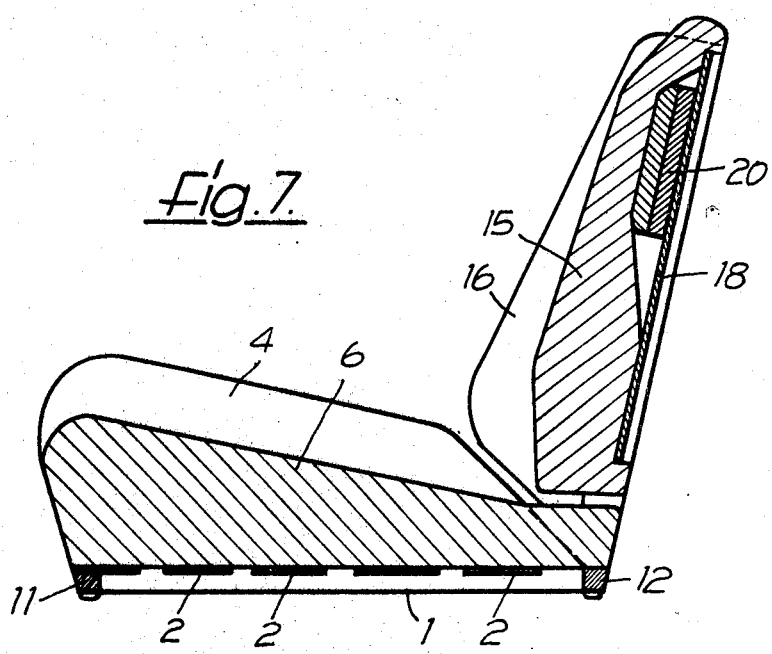

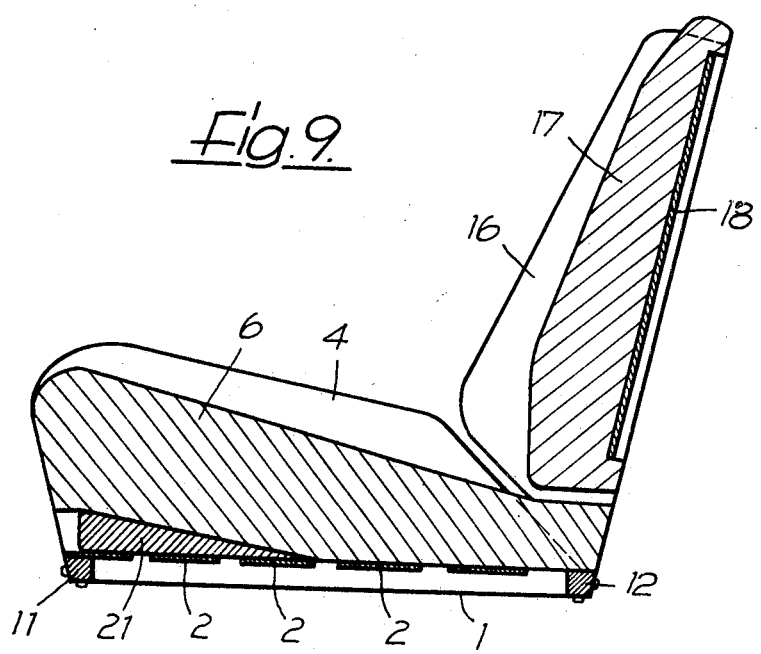
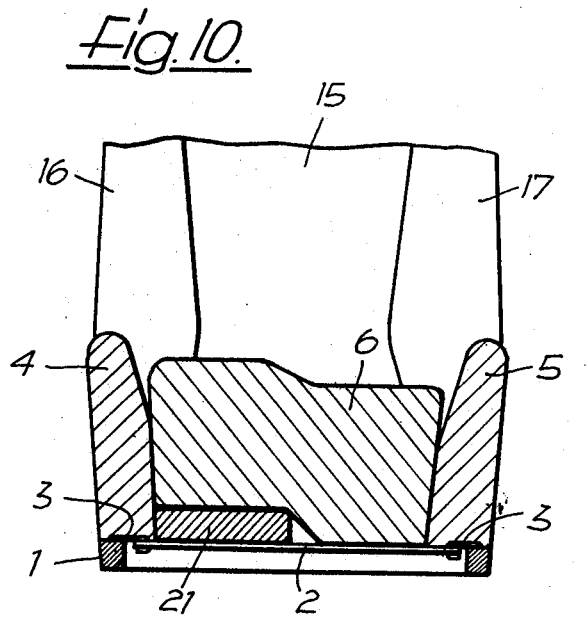

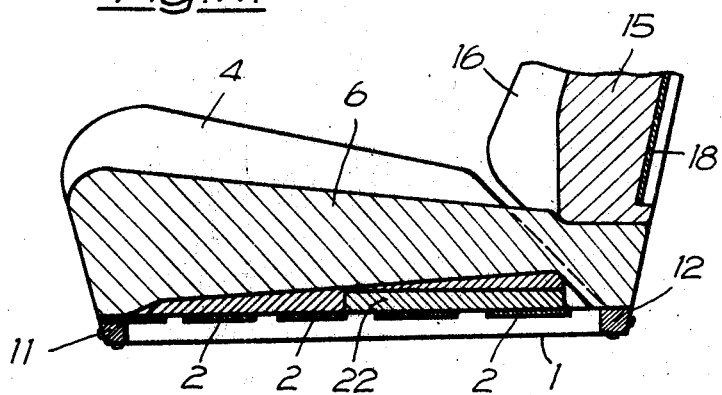
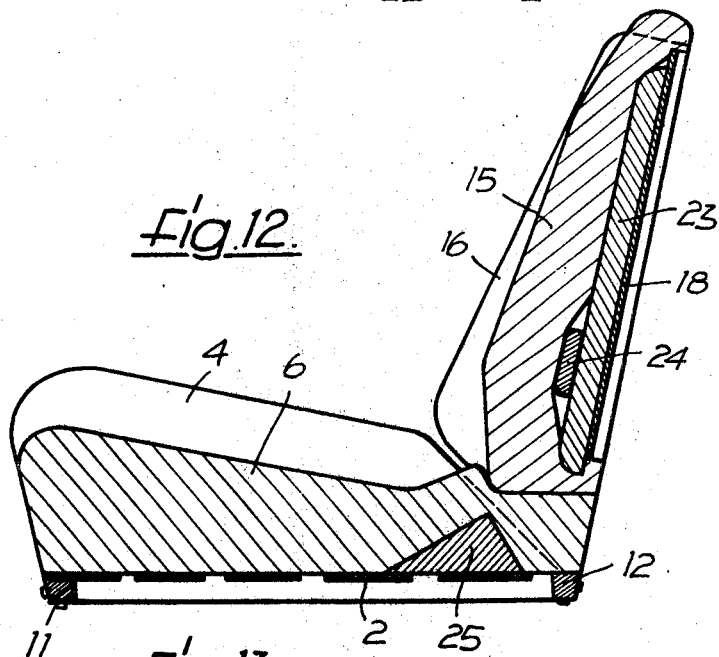

United States Patent Office 3,495,871
Patented Feb. 17, 1970

3,495,871
ADJUSTABLE SEAT, PRIMARILY FOR MOTOR VEHICLES
Jorg Resag and Wolfgang Fussnegger, Stuttgart-Degerloch, Germany, assignors to Recaro A.G., Glarus, Switzerland, a corporation of Switzerland
Filed Nov. 3, 1967, Ser. No. 680,476
Claims priority, application Germany, Nov. 29, 1966, R 44,677
Int. Cl. A47c 7/14
U.S. Cl. 297—284    13 Claims

ABSTRACT OF THE DISCLOSURE

A seat structure wherein the shape of the cushion of the seat and back rest may be easily changed by the insertion of pads or the like of different sizes and shapes between the body of the cushion and the cushion support.

---

The present invention relates to a seat structure which is primarily intended for use in motor vehicles and is designed so as to permit the outer shape of the seat cushion which is mounted on the cushion support to be varied.

For varying the shape of the cushion of the back rest of a seat which is desirable, for example, for providing a good lateral support for the backs of persons of different sizes it has already been disclosed in the prior art to divide the cushion of the back rest into three separate sections and to mount the lateral sections in a fixed position, while the main central section is slidable relative thereto. This known seat construction is, however, relatively expensive. A still more expensive construction which has also been proposed consists in pivotably mounting the lateral sections.

The prior art further discloses a seat structure in which the seat cushion is likewise divided into three separate sections and the lateral sections are pivotably mounted on the seat frame and are adjustable to different pivoted positions. Although such a seat has the advantage that its occupant may either adjust the seat surface to a large size or adjust the seat so as to have a good lateral support independent of the width of his body, this construction is likewise rather expensive.

There is another expensive seat construction of a known type, in which the area of the cushion which supports the thigh and/or buttocks parts of the occupant is interrupted and replaced by a resilient plate which is adjustable in height and in the longitudinal direction.

Finally, for varying the shape of the upper surface of the seat cushion it is known to apply a seat pad or the like upon the upper surface of the cushions. Such a seat pad has the disadvantage that it has to be provided with a separate cover or that it has to be given a pleasing appearance in some other manner which is a requisite of seats especially in cars aside from their technical features. However, even if such an outer pad is provided, for example, with a cover, it gives the entire upholstery a makeshift appearance.

It is an object of the present invention to provide a seat structure which permits the shape of the cushion of the seat and back rest to be varied by very simple and inexpensive means so as to conform with the shape of the body of different occupants of the seat especially for the purpose of supporting the body of such occupant in accordance with its normal or abnormal shape and of providing the particular occupant of the seat with the highest possible comfort.

This object is attained according to the invention by providing a seat wherein the cushions forming the seat part and/or the back rest are adjustable on and relative to their supporting frames by the owner or occupant by the insertion of at least one supporting pad or similar element between these cushions and their support or by the removal of such pads or elements from the cushions and their supports.

Since according to the invention the supporting pad is provided between the cushion and its support, it is invisible from the outside so that the apperance of the seat is not harmed by that of the supporting pad. Furthermore, the invention permits the contours of the cushions of the seat part as well as the back rest to be varied practically in any manner, at any point, and at any time since it only requires suitable supporting pads or similar elements to be inserted between the cushions and their support or the inserted elements to be exchanged for others. A great advantage of the invention is also the fact that the person himself who wishes to occupy the seat may easily carry out such an insertion, removal or exchange of the supporting pads at any time.

A further advantage which is attained by the invention is the fact that for different purposes and also for different parts of the seat the owner or occupant may select supporting pads of different materials. Thus, for example, for soft parts of a seat and its back rest a soft supporting pad, for example, of foam rubber or plastic may be employed, while for harder parts a supporting pad of a harder material, for example, of a highly compressed rubberized substance or hard foam plastic, may be inserted.

The supporting pad according to the invention may also be composed and assembled of several parts so that the owner or occupant of the seat may assemble supporting pads of practically any shape of different basic elements which he may purchase as prefabrricated parts.

As a rule, the friction between the supporting pad and the cushion of the seat or back rest and the cushion support will be fully adequate to secure the supporting pad in the desired position. Thus, no additional securing means will be required. This is true particularly when the supporting pad consists of foam rubber or plastic or a similar material.

According to one preferred embodiment of the invention, the cushion of the seat part and/or the back rest is divided into three separate parts, namely, a main central part and two lateral parts. These lateral parts are preferably rigidly secured to the support of the seat or back rest and are not adjustable insofar as they themselves are concerned. The nonadjustablity of these lateral cushion parts is usually of no importance since it is primarily the adjustability of the main central part which is required. The immoveability of the lateral parts has, on the other hand, the advantage that no provision has to be made for covering the lateral sides of the central part, or for laterally covering the supporting pad or pads which are inserted between the central part and the cushion support and that, if the main central part is fitted tightly between the lateral parts, no additional means are required for securing the central part on the cushion support.

Regardless of whether or not the central cushion part is clamped tightly betwen the lateral parts, the invention provides that the central part preferably rests loosely on the cushion support and is preferably removably connected to the cushion support only at its front and rear sides which extend from one lateral cushion part to the other. A seat construction of this type permits a supporting pad or similar element to be very easily inserted between the central cushion part and the cushion support. If the central cushion part is secured to the cushion support so as to be easily disconnected therefrom, the supporting pad or pads may be inserted just as easily as if the central part were resting loosely and unsecured on the cushion support.

For complying with all of the requirements of an adjustable cushion for a seat and its back rest, the invention further provides that the central cushion part and/or the support of the seat part is preferably adjustable in its longitudinal direction and adapted to be locked in the adjusted position within the seat frame. Such a longitudinal adjustability may be attained in a very simple manner by designing the contact surface of the central cushion part facing the cushion support in such a manner that a frictional engagement and partly also a positive connection between these two elements will be produced. This may be attained, for example, by providing the cushion support in the form of transversely extending straps which are spaced from each other so that when a load is resting on the central cushion part, it will be pressed into the gaps between these straps.

In order to compensate for the displacement of the cushion relative to the cushion support which may be due to the insertion of a supporting pad or similar element or the shifting of the cushion in its longitudinal direction, it is advisable to provide such a cushion which is to be connected to the cushion support with suitable connecting elements which are adjustable to different effective lengths. These connecting elements may be provided, for example, by extensions of the front and rear ends of the covering of the cushion which form strips which may be removably secured to the cushion support, for example, by buttons, eyes, snap fasteners, or the like. The connecting elements may, however, also consist of an elastic material which is of advantage particularly if the covering material of the cushion is likewise elastic.

The features and advantages of the present invention will become further apparent from the following detailed description thereof which is to be read with reference to the accompanying drawings, in which—

FIGURES 3 to 12 show longitudinal and cross sections of seats similar to those as shown in FIGURES 1 and 2 but provided with supporting pads of different shapes and provided at different parts of the seat; while FIGURE 13 shows side views of different supporting pads or parts thereof.

Figure 1:
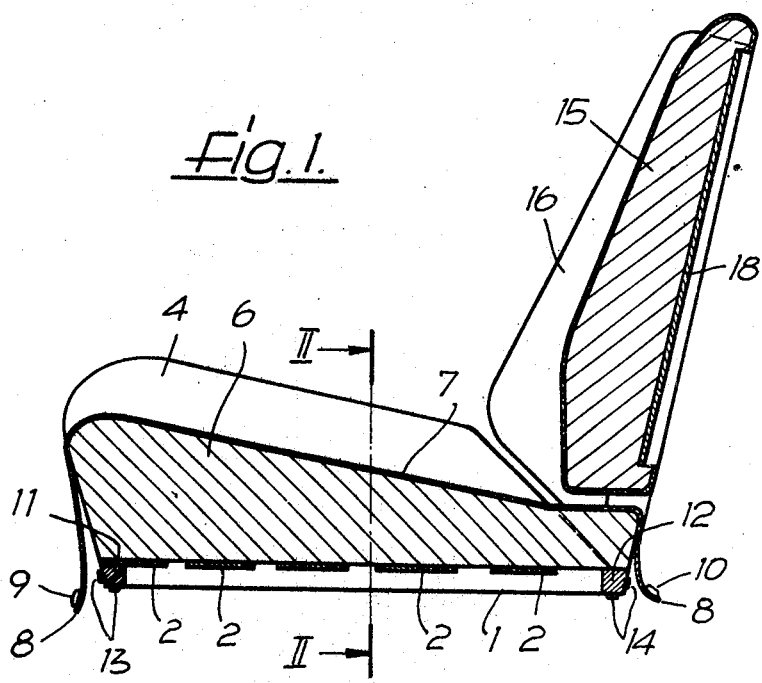
FIGURE 1 shows a longitudinal section of a seat according to the invention without a supporting pad.
Figure 2:
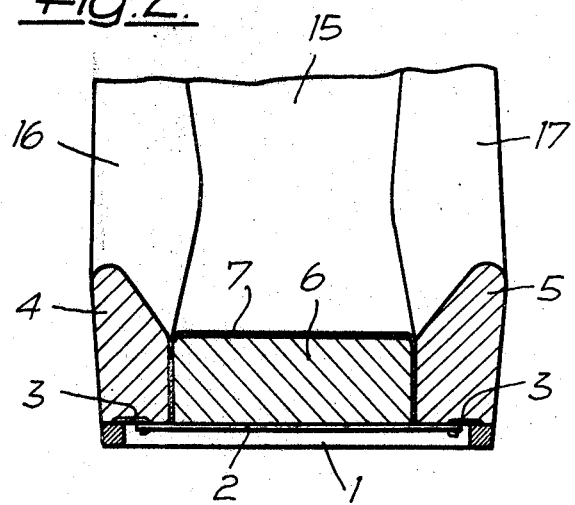
FIGURE 2 shows a cross section which is taken along the line II—II of FIGURE 1.

As illustrated in the drawings, a closed seat frame 1 which serves for connecting the seat to a suitable support carries a plurality of elastic straps 2 which are hooked upon the frame 1 by means of brackets 3, as shown in FIGURE 2, and extend parallel to and spaced from each other in the transverse direction of the seat. The seat cushion is divided in the transverse direction of the seat into three parts, namely the two outer parts 4 and 5 and the main central part 6 which is fitted tightly between the outer parts. The two outer parts 4 and 5 are secured to the straps 2, while the central part 6 which consists of foam rubber or plastic rests loosely on the straps. All three seat cushion parts 4 to 6 are covered with a suitable covering material. The front and rear ends of the cover 7 of the central part 6 form strips 8 which extend downwardly over the lower edges of the cushion body and are each provided with one or several parallel rows of snap fastener elements 9 and 10, respectively, which extend in the transverse direction of the seat. The front and rear crossbars 11 and 12 of the seat frame 1 are each provided at its outer side facing toward the front or rear respectively, and also on its lower side with a row of snap fastener elements 13 or 14 to which the snap fastener elements 9 and 10 may be attached. The distance between the lower front and rear edges of the central cushion and the associated crossbars is therefore adjustable to a certain extent. In the particular embodiment of the invention as illustrated in the drawings, the lateral cushion parts 4 and 5 are higher than the central part 6 when the latter rests directly on the straps 2. It is, however, to be understood that the invention is not limited to any particular shape or height of the lateral parts 4 and 5 of the seat.

The cushion of the back rest which is connected to the seat frame 1 by means of an undivided frame is likewise divided into a central part 15 and two lateral parts 16 and 17 in accordance with the cushion parts of the seat. These cushion parts of the back rest are, however, not supported by straps but by a wide elastic strip 18 which is clamped to the frame of the back rest. The central cushion part 15 which is thinner than the lateral parts 16 and 17 is secured to the back-rest frame in the same manner as the central part 6 is secured to the seat frame 1. The structure and composition of the cushion of the back rest is otherwise equal to that of the seat cushion.

Figure 3:
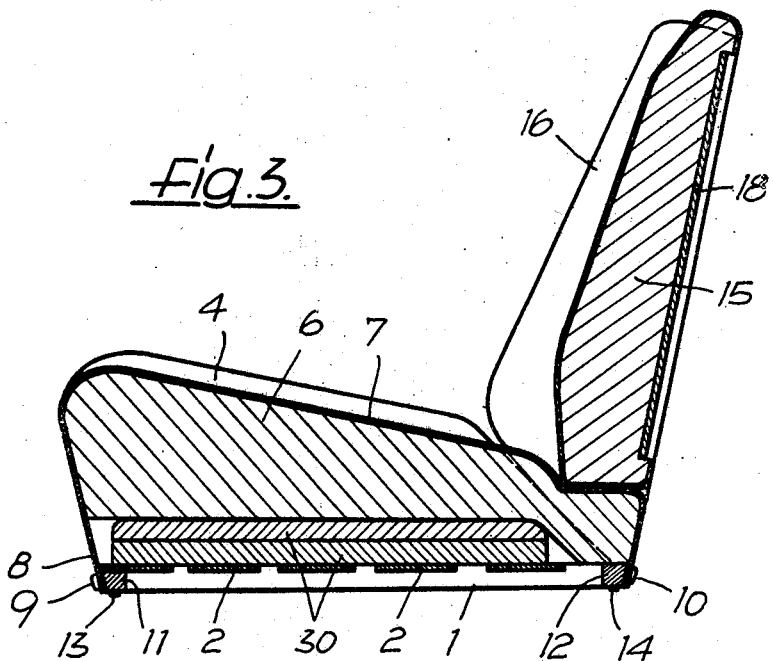
Figure 4:
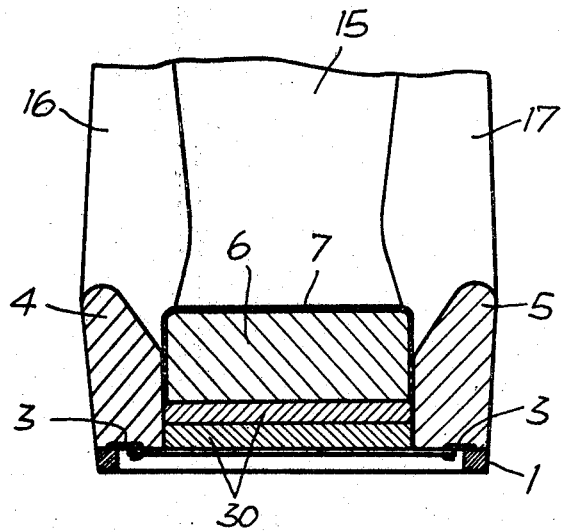

Each of the two lateral parts 4 and 5 of the seat cushion has an inclined surface facing the central part 6 which gives the person sitting on this seat a certain lateral support. For increasing the width of the seat either for adapting it to the shape of its occupant or for giving such a person more freedom of movement, the central seat part 6 may be raised to a higher level. For this purpose, the invention provides that between the central part 6 and the elastic straps 2 a supporting pad 30 be inserted which according to the embodiment as shown in FIGURES 3 and 4 consists of two superimopsed plates. For inserting this supporting pad 30, it is only necessary to loosen the front strip 8 from the crossbar 11. After the support 30 has been inserted, the front strip 8 is tightened and again secured to the crossbar 11. If a very high supporting pad is required, it may be desirable or necessary also to readjust the rear strip 8 of the central part 6 on the rear crossbar 12.

If merely the height of the central cushion part 6 is to be changed, a supporting pad may be employed which is made of foam rubber or plastic. If, however, the degree of softness of the central cushion part 6 is also to be changed, a pad may be inserted which either consists of a softer or harder material.

Figure 5:
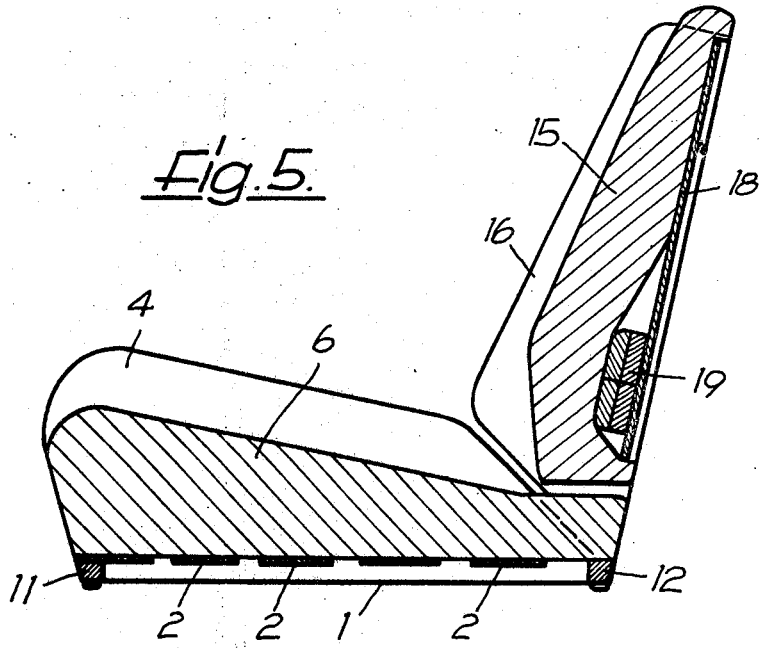
Figure 6:
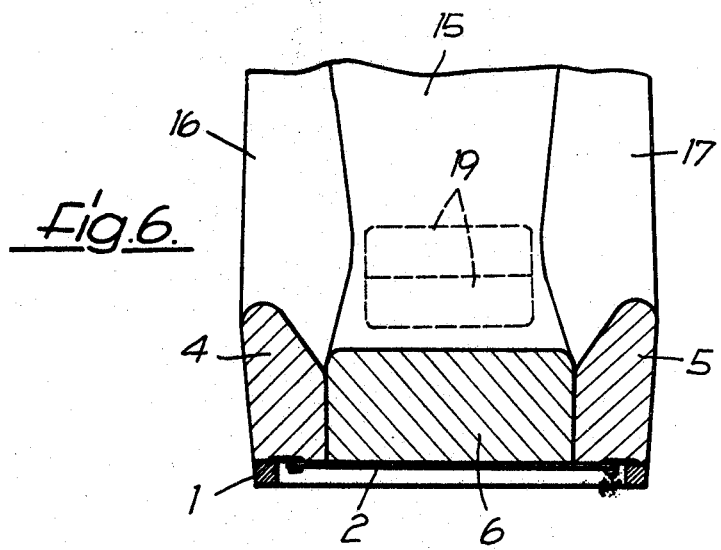

In order to support the natural curvature of the spine of the occupant of the seat, the invention further provides, as shown in FIGURES 5 and 6, that a transverse supporting pad 19 be inserted between the central cushion part 15 and the elastic strip 18 of the back rest substantially at the level of the hips of a person occupying the seat. The thickness and width of such a pad 19 which may consist, for example, of foam rubber or plastic, may be selected by that person himself to suit his own comfort. In the particular embodiment as shown in FIGURES 5 and 6, the size and shape of the supporting pad 19 may be varied to a certain extent by making it out of four separate strips.

FIGURES 7 and 8 show a supporting pad 20 which is inserted into the back rest and is held centrally within the upper area of the central cushion part 15 so as to give the occupant of the seat a greater freedom of his shoulders to enable him to operate the steering wheel more easily and also to provide an increase back support and to oppose the formation of a round back. The supporting pad 20 may, for example, be slipped into the upper end of the back reset between the central cushion part 15 and the elastic fabric 18 after the upper end of the central part 15 has been disconnected from the frame of the back rest. Since the supporting pad 20 is clamped tightly between the central cushion part 15 and the elastic fabric 18, it will not require any additional securing means to maintain it in a fixed position in the place where inserted.

In order to prevent a crampy feeling which will normally occur in the right leg of a driver operating the gas pedal after driving for a long time and to attain a relaxed position of the right leg, it is necessary to support the upper thigh of the right leg up to a point close to the knee. As illustrated in FIGURES 9 and 10, the invention provides for this purpose that a wedge-shaped supporting pad 21 be inserted in such a position between the central part 6 of the seat cushion and the elastic straps 2 that it will only be located at the right side of the central part and ascend toward the front. These supporting pads 21 may likewise be supplied of different sizes and shapes so as to enable each driver to select the most suitable pad for his own comfort.

For attaining a better driving comfort it may also be desirable to shift the central seat part 6 in its longitudinal direction. This is likewise possible according to the invention since the central seat part 6 when loaded will be firmly held in the selected position primarily by bulging downwardly through the gaps between the straps 2 and by thus being locked in place by friction as well as by its interengagement with the straps under the weight of the occupant. When the seat is not occupied, the friction between the central cushion part 6 and the two lateral parts will alone be sufficient to prevent a displacement of the central part 6.

Of course, such a supporting pad does not have to be confined to the right side of the central part 6 of a driver's seat. Thus, for example, by providing one or more supporting pads of a suitable shape it is possible to vary the shape of the surface of any seat in accordance with any physical abnormality of its occupant as may be necessary, for example, for invalids. Furthermore, by employing a wedge-shaped supporting pad which extends over the entire width of the central seat part 6, it is possible to vary the inclination of the seat surface.

FIGURE 11 illustrates a seat in which between the central cushion part 6 and the elastic straps 2 a supporting pad 22 is inserted which extends over the entire width of the central part 6 and increases in thickness toward the rear so that especially the rear part of the seat surface will be raised which amounts to a vertical adjustment of the seat. Due to the inclination of the inner sides of the lateral cushion parts 4 and 5, the width of the seat will thus also be increased. This simultaneous adjustment of the height and width of the seat is in accordance with the fact that most long persons are slender, while most small persons are wide.

By providing a plate-shaped supporting pad 23 in the back rest, as shown in FIGURE 12, the central part 15 of the back rest may be shifted forwardly and the back rest may thus be adjusted to accommodate a person with a wider back. Of course, by providing a supporting pad 23 of a suitable shape, it is also possible to shift certain sections of the central part 15 more forwardly than others. The back rest according to FIGURE 12 is further provided with an additional supporting pad 24 substantially at the level of the hips of the occupant similarly as shown in FIGURES 5 and 6.

FIGURE 12 further illustrates a relatively thick and steeply inclined wedge 25 of a highly compressed rubberized material or hard foam plastic which is inserted underneath the rear end of the central part 6 of the seat cushion and slopes off toward the front. This supporting pad 25 serves for supporting the pelvis of the occupant in its natural upright position and like the supporting pad 24 contributes in supporting the lumbar region of the spine and its natural curvature. Such a wedge 25 may, of course, also be combined with all of the other supporting pads as described.

In order to facilitate the adjustment of the seat and back rest by the occupant himself, he may be given the choice of a number of different prefabricated pad elements. As illustrated in FIGURE 13, these elements may consist, for example, of two wedges 26 and 27 as are required, for example, for forming an inclined plane as shown in FIGURE 12 or for supporting the thigh as shown in FIGURES 9 and 10. Individual strips 28 may be obtained by being torn off a pregrooved plate 29 which may be employed, for example, for a height adjustment of the seat as illustrated in FIGURE 3.

Although our invention has been illustrated and described with reference to the preferred embodiments thereof, we wish to have it understood that it is in no way limited to the details of such embodiments.

Having thus fully disclosed our invention, what we claim is:

1. A seat structure comprising two parts connected to each other and forming a seat and a back rest, at least one of said parts is divided into three separate sections forming a main central section and a lateral section on each side of said central section, each of said parts comprising a cushion of an elastic material and a cushion support normally connected to each other, and at least one element adapted to be inserted between and to be removed from said cushion and cushion support and when inserted deforming said cushion so as to change the shape of at least its upper surface and its position relative to its support, said lateral sections being rigidly connected to said cushion support.

2. A seat structure as defined in claim 1, wherein said element is held in a selected position between said cushion and its support by its frictional engagement with them when clamped between them.

3. A seat structure as defined in claim 2, further comprising means for clamping said cushion and cushion support tightly to each other.

4. A seat structure as defined in claim 1, wherein the surface of said cushion support facing said central section of said cushion is provided with recesses, at least the outer surface of said element facing said cushion support when inserted between said support and said cushion and at least the surface of said cushion facing said cushion support being deformable so that under the weight of a person sitting on said central section parts of said surface of said cushion when engaging with said cushion support and also parts of said surface of said element when inserted will be pressed into said recesses.

5. A seat structure as defined in claim 1, wherein when said element is inserted between said central section and said cushion support, said element will be at least partly pressed into said elastic central section so as to be held in a fixed position relative thereto and to deform said cushion when said central section is loaded by the weight of a person sitting thereon.

6. A seat structure as defined in claim 1, wherein said central section rests loosely on said cushion support and is fitted between said lateral sections so as to be held in a fixed position relative to said cushion support by the frictional engagement between said sections.

7. A seat structure as defined in claim 1, wherein said central section rests loosely on said cushion support, and further comprising connecting means on the front and rear sides of said central section extending from one of said lateral sections to the other, and means for removably securing said connecting means under tension to said cushion support.

8. A seat structure as defined in claim 1, wherein said central section is slidable longitudinally to different positions between said lateral sections, and further comprising means for releasably securing said central section in any of said positions to said cushion support.

9. A seat structure as defined in claim 1, wherein said cushion support comprises a supporting frame carrying all of said sections, and substantially parallel resilient straps connected under tension to said frame at least of said seat and spaced from each other and extending transversely of said cushion.

10. A seat structure as defined in claim 7, wherein said connecting means are adapted to be adjusted to different effective lengths.

11. A seat structure as defined in claim 7, wherein said connecting means consist of an elastic material.

12. A seat structure as defined in claim 7, further comprising a cover on said central section and having front and rear ends extending loosely beyond the lower edges of said central section and forming said connecting means.

13. A seat structure as defined in claim 12, wherein said cushion support includes a frame for supporting all of said sections, at least said front and rear ends of said cover consisting of strips of elastic material extending from one lateral side of said cushion to the other, said securing means comprising at least one first row of snap fastener elements secured to the front and rear members of said frame and at least one second row of associated snap fastener elements on each of said strips adapted to be attached to and disconnected from said first row of snap fastener elements.

References Cited

UNITED STATES PATENTS

| | | | |
|---|---|---|---|
| 2,894,565 | 7/1959 | Conner | 297—284 |
| 3,086,817 | 4/1963 | Wilfert | 297—284 |
| 3,110,042 | 11/1963 | Slemmons | 5—345 |
| 3,148,389 | 9/1964 | Lustig | 5—337 |
| 3,216,027 | 11/1965 | Jackson | 5—337 |
| 3,243,828 | 4/1966 | McCarty | 5—338 |
| 3,288,525 | 11/1966 | Cerf | 297—284 |
| 3,301,591 | 1/1967 | Jacobs | 297—219 |
| 3,321,241 | 5/1967 | Froelich | 297—284 |

BOBBY R. GAY, Primary Examiner

GLENN O. FINCH, Assistant Examiner